United States Patent [19]
Earp, deceased et al.

[11] 4,385,299
[45] May 24, 1983

[54] APPARATUS FOR TRANSMITTING BEARING INFORMATION

[75] Inventors: Charles W. Earp, deceased, late of London, England, by Cicely M. Earp, executrix; Clive D. Wickenden, executor, Chorleywood, England; Rolf Johannessen, Harlow, England; Francis G. Overbury, Cuffley, England

[73] Assignee: International Standard Electric Corporation, New York, N.Y.

[21] Appl. No.: 199,434

[22] Filed: Oct. 22, 1980

[30] Foreign Application Priority Data

Oct. 23, 1979 [GB] United Kingdom ............... 7936772

[51] Int. Cl.³ ............................................. G01S 1/44
[52] U.S. Cl. ............................................. 343/106 R
[58] Field of Search .............. 343/106 R, 106 D, 101, 343/102

[56] References Cited

U.S. PATENT DOCUMENTS

3,173,093  3/1965  Most et al. .................. 343/106 D

FOREIGN PATENT DOCUMENTS

1429743  3/1976  United Kingdom .

Primary Examiner—Theodore M. Blum
Attorney, Agent, or Firm—T. E. Kristofferson; W. T. O'Neil

[57] ABSTRACT

An electronic navigation beacon, particularly for coastal navigation, in which an unmodulated carrier $f_c$ is transmitted from the first antenna of a pair of antennas, and a periodically modulated sideband $f_c \pm f_a$ is transmitted from both antennas, where $f_a$ is in the audio frequency domain. A cyclical RF phase variation is imposed on the sideband signal transmitted from the second antenna. The effect in space is that of a rotating radial having an audio frequency null, the periodic modulation providing the listener at a remote point with timing information enabling determination bearing as a function of the time of passage of the radial through the remote point relative to the start of rotation of the radial.

1 Claim, 4 Drawing Figures

APPARATUS FOR TRANSMITTING BEARING INFORMATION

BACKGROUND OF THE INVENTION

1. Field of the Invention

This invention relates to apparatus for transmitting bearing information and is particularly suitable for use as a coastal navigation beacon.

2. Description of the Prior Art

British Pat. No. 1,429,743 discloses apparatus for transmitting bearing information including two fixed omnidirectional antennas spaced a predetermined distance apart, means for transmitting from one antenna a composite signal comprising a combination of a VHF carrier frequency signal periodically modulated by an audio frequency signal and the unmodulated carrier frequency signal such that the modulated and unmodulated carrier frequency signals are in antiphase, means for transmitting from the second antenna the periodically modulated carrier frequency signal only, means for cyclically varying the phase of one of the transmitted signals relative to the other transmitted signal, and means for distinctively altering the audio frequency modulation of the carrier frequency signal at the commencement of each cyclic variation in phase of the one transmitted signal.

Such an apparatus will transmit signals which can be picked up by any VHF communications receiver. The transmission creates, in effect, a radio vector rotating slowly about a fixed point, i.e. the site where the two antennas are located. This vector is defined, to the VHF radio listener, by a point in time when the received frequency modulated signal has a minimum amplitude. The listener will hear first a distinctive signal which serves to identify the particular shore station being received and also working the start of a period in time. He then hears a sereis of equally spaced clearly distinguished audio signals. Beginning at the end of the distinctive timing signal the listener counts the number of regularly spaced audio signals until the amplitude of the audio frequency modulation reaches a null. The count so obtained can be directly translated into a bearing on the shore station, e.g. by reference to a table. Thus, with the aid of no more than a VHF radio receiver, a bearing table (which could be memorized) and a chart (which could also be memorized) a sailor can determine his bearing with respect to a fixed point on land and navigate a safe channel along that bearing.

The present invention proposes an apparatus which also rotates a radio vector but which is simpler in construction.

SUMMARY OF THE INVENTION

According to the present invention there is provided apparatus for transmitting bearing information including two fixed antennas spaced a predetermined distance apart, means for transmitting from a first one of the antennas an unmodulated VHF carrier frequency signal having a frequency $f_c$, means for transmitting from both antennas a signal being a sideband of the unmodulated VHF signal, the sideband having a frequency of either $f_c+f_a$ or $f_c-f_a$, where $f_a$ is an audio frequency, means for periodically modulating the sideband signal and means for cyclically varying the RF phase of one of the transmitted signals relative to the other transmitted signal, the duration of each cyclic phase variation being a multiple of the modulation period of the sideband signal.

In a typical coastal navigation beacon the periodic modulation of the sideband can be an interruption of the signal for 100 ms in every 500 ms, while the cyclic phase variation is 32 seconds in duration.

An embodiment of the invention will be described hereinafter with reference to the accompanying drawings.

DETAILED DESCRIPTION OF THE PREFERRED EMBODIMENT

Figure 1:
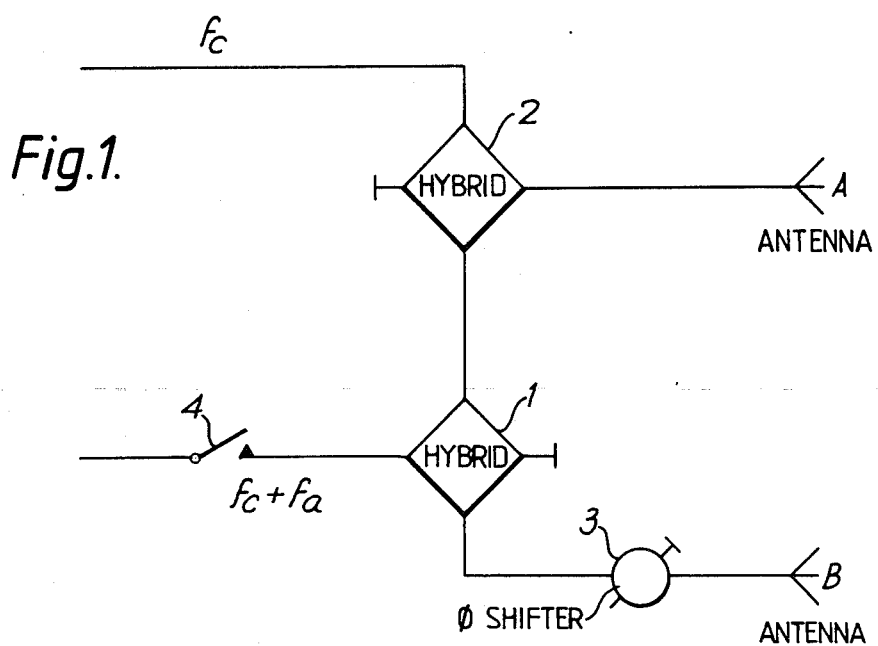
FIG. 1 illustrates schematically an electronic beacon according to the invention.

In the arrangement shown in FIG. 1 two antennas A and B are fed, via power splitting hybrids 1 and 2, with a signal composed of an RF carrier of frequency $f_c$ (preferably in the VHF domain) modulated with an audio frequency of $f_a$. Typically the frequency $f_c$ may be 160 MHz and $f_a$ may be 1 KHz, and the $f_c+f_a$ signal is hereinafter referred to as a "sideband" signal. The sideband signals are arranged to have 180° phase difference at the two antennas. Thus along the line which is the perpendicular bisector of the antenna baseline, the vector sum of the two components will be zero. This line of zero signal strength will hereinafter be referred to as a "radial". If now a variable phase shifter 3 is adjusted to vary the RF phase difference between the antennas the radial will be caused to rotate in space.

At the same time an unmodulated carrier of frequency $f_c$ is fed to antenna A only, via the power combining hybride 2. The level of this carrier-only signal is independent of angle from the baseline (except for the effect of the antenna radiation pattern), and it is not affected by the phase shifter 3.

Since the two signals $f_c$ and $f_c+f_a$ are only 1 KHz apart they will both pass through a standard VHF receiver's passband, so that the net signal observed by the receiver will be the RMS value of the vector sum of the carrier and the sideband signal. The two signals will also interact so as to give a tone in the receiver, said tone having the frequency $f_a$ and a tone level controlled by the ratio of the two signal levels. Thus, if the RF phase difference is varied in a sweep fashion, and the radial consequently rotates, the audio output of a remote receiver at a given position will be notched, the time position of the notch relative to the timing of the sweep being dependent on the bearing of the remote receiver relative to the beacon.

Figure 2:
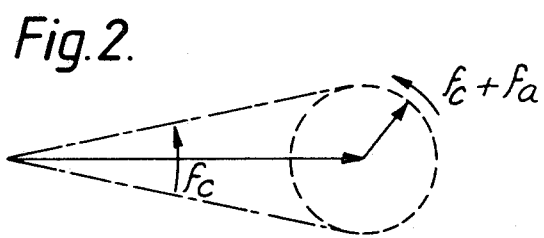
FIG. 2 is a vector diagram of signals transmitted from the beacon of FIG. 1.
Figure 3:
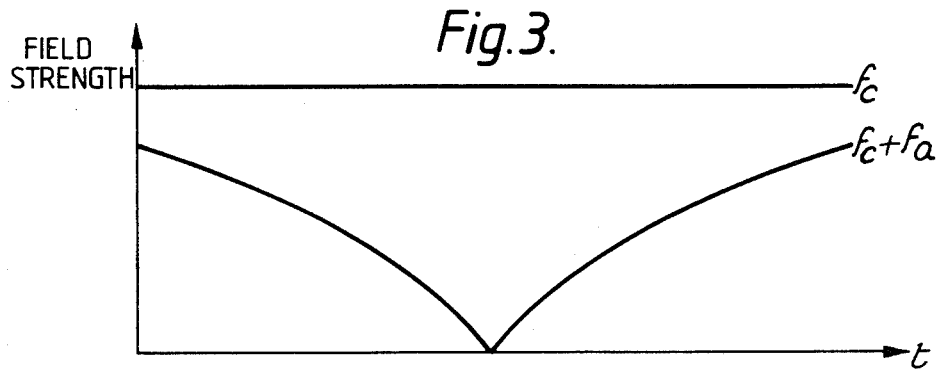
FIG. 3 illustrates field strengths of signals transmitted from the beacon of FIG. 1.

FIG. 2 illustrates the 1 KHz modulation of the received signals in vector diagram form and FIG. 3 illustrates the amplitude of the carrier and sideband signals at the said remote receiver.

To make use of the signals transmitted by the beacon the receiver operator must know:

(a) the time at which the radial rotation commences, (b) the time at which the radial passes through the receiver position, relative to (a) above, (c) the rate at which the radial rotates, and (d) the bearing of the radial at the commencement of the rotation.

These items of information are best provided by superimposing on the sideband signal a digital encoding modulation, by means of a switch 4. Typically, such a digital modulation sequence may comprise 67 beats each of 500 ms duration and 400 ms of sideband followed by 100 ms of no sideband signal. The first two beats provide a timing signal (a) identifying the start of the cycle. The next 64 beats are used to time the occurrence of the radial passing through the receiver position (b). The operator simply counts the beats until a null occurs in the audio output, i.e. the notch shown in FIG. 3. Assuming that the radial rotates through 124° at a steady rate of 4° per second (c) the operator can translate the number of bears counted until the notch occurs into a bearing, e.g. 32 beats equals a bearing of 64° from the initial position of the radial. The last beat defines the end of the beat sequence. Items (c) and (d) are provided to the operator beforehand, e.g. by way of a published chart.

One problem associated with the arrangement described above is that not only is the required radial rotated on one side of the baseline, a second unwanted radial is rotated in the opposite direction on the other side of the baseline, the second radial being a mirror image of the desired radial. British Pat. No. 1,541,233 acknowledges this problem and provides a cure therefor. That invention may be applied hereto. To do so, there are provided three antennas forming two baselines with different azimuthal alignment to rotate two radials simultaneously on one side of the baseline in such a manner that these radials are angularly coincident and reinforce one another to provide a single desired radial, while the mirror images of these two radials are angularly separated.

For a receiver located on the wrong side of the baseline a tone level above the minimum required for a null will always be received because when one undesired radial passes through the receiver position the receiver will still receive a significant signal from the antenna pair associated with the other unwanted radial.

Figure 4:
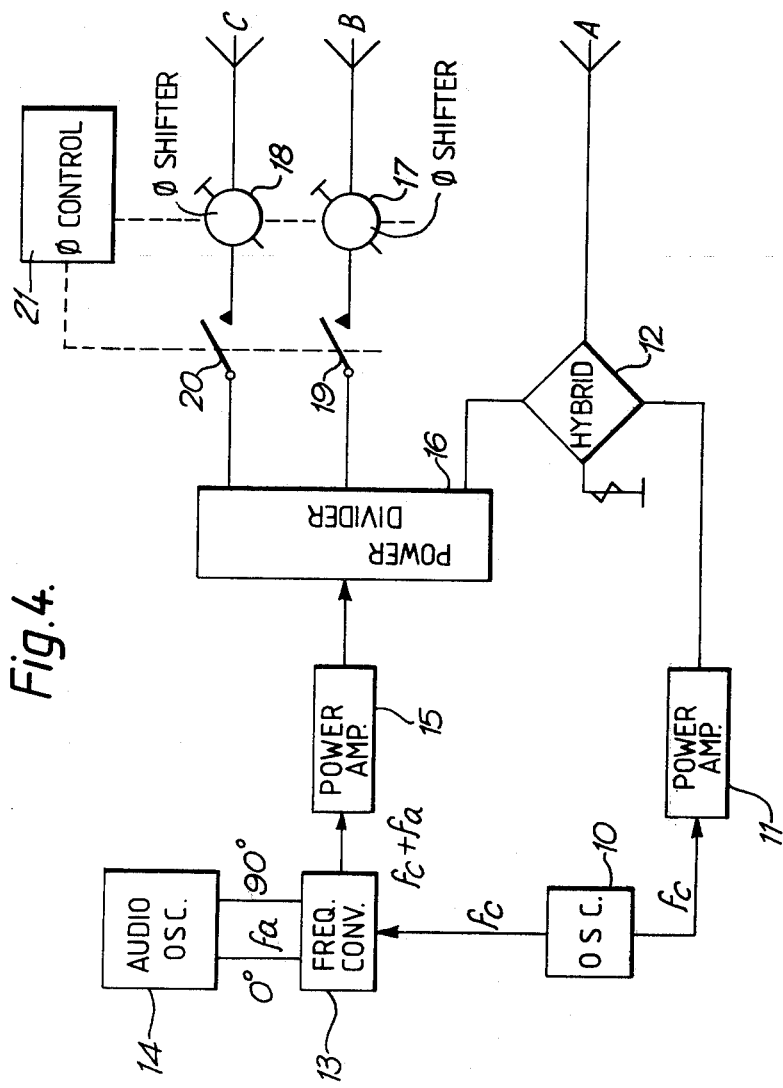
FIG. 4 illustrates a modified form of beacon according to the invention.

FIG. 4 illustrates an electronic beacon according to the present invention utilizing three antennas to obviate the aforementioned mirror image radials. Such an arrangement may also be employed to provide a wide baseline system with better protection against azimuthal multipath.

In FIG. 4, oscillator 10 generates the carrier frequency $f_c$ and feeds this via power amplifier 11 and combining hybrid 12 to antenna A. The carrier frequency $f_c$ is fed to a frequency converter 13 which also receives the output from an audio oscillator 14 which generates frequency $f_a$. The sideband signal $f_c+f_a$ from converter 13 is fed via a power amplifier 15 and power dividing network 16 to the antennas A, B and C. The sideband signal is fed to antenna A via the hybrid 12, and to antennas B and C via controllable phase shifters 17 and 18. The phase shifters are operated by a suitable control circuit 21 to effect rotation of the radials generated by the antenna pairs AB and AC, respectively. This rotation is effected according to the format discussed hereinbefore by conventional means.

Simultaneously the control circuit 21 switches the power amplifier 15 to provide the beats referred to above. Finally, in order that additional beacon identification and information signals may be broadcast omnidirectionally in the intervals between radial rotation cycles without suffering from unwanted cancellation effects in any direction, switches 19 and 20 are opened during those intervals and the information signals are broadcast from antenna A alone. Finally the three antennas may be used in the cyclically switched manner disclosed in the aforementioned British Pat. No. 1 541 233 to produce a beacon with 360° coverage.

We claim:
1. Apparatus for transmitting bearing information, comprising:
   first and second fixed antennas spaced a first predetermined distance apart;
   first means for transmitting an unmodulated VHF carrier signal of frequency $f_c$ from a first one of said antennas;
   second means for transmitting an unmodulated VHF signal of a single frequency selected from $f_c+f_a$ and $f_c-f_a$, where $f_a$ is an audio frequency;
   third means for cyclically varying the RF phase of one of said first and second means transmitted signals relative to the other to produce a rotating signal null at a distance from said apparatus;
   fourth means for periodically modulating said second means selected signal to convey timing information relating to the rotation of said signal null, the duration of each of said third means cyclical RF phase variations being a multiple of the period of said fourth means modulation;
   fifth means for inhibiting transmission of signals from at least one of said antennas which is subject to said third means cyclical RF phase variation during intervals between successive ones of said third means cycles;
   sixth means comprising a third antenna spaced a second predetermined distance from said first antenna, and means for feeding said third antenna with the output of said fourth means;
   and seventh means for cyclically varying the RF phase of the signal transmitted by said third antenna synchronously with said phase variation of the same signal from said second antenna but offset in phase by a predetermined amount such that the two antenna pairs formed by said first and second antennas and by said first and third antennas each produce coincident rotating radials on one side of their respective baselines and angularly separated rotating radials on the opposite side of said baselines.

* * * * *